Jan. 12, 1932.  D. B. HOSEASON  1,841,122

SQUIRREL CAGE INDUCTION MACHINE

Filed May 19, 1931

Inventor:
Donald B. Hoseason,
by Charles E. Tullar
His Attorney.

Patented Jan. 12, 1932

1,841,122

UNITED STATES PATENT OFFICE

DONALD BRIGHT HOSEASON, OF BOWDON, ENGLAND, ASSIGNOR TO GENERAL ELECTRIC COMPANY, A CORPORATION OF NEW YORK

SQUIRREL CAGE INDUCTION MACHINE

Application filed May 19, 1931, Serial No. 538,516, and in Great Britain June 14, 1930.

My invention relates to improvements in squirrel cage induction machines and more particularly to the secondary members thereof in which the slots and conductor bars are spiraled and the bars are insulated from one another in the slots.

It has heretofore been proposed to spiral the squirrel cage bars of induction motors to eliminate low torque points at starting where the slot number ratio in primary and secondary would otherwise be such as to produce a locking tendency. I have discovered that if the bars of the spiraled slot secondary are suitably insulated from each other in the slots that unexpected improvements in efficiency are obtained without impairing the other beneficial results of spiraling. The reasons for this, as at present understood, and a preferred embodiment of my invention will be hereinafter explained in connection with the accompanying drawing while the features of the invention which are considered to be novel and patentable will be pointed out in the claims appended hereto.

Figure 1:
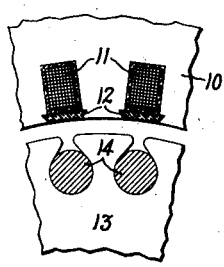
Figure 4:
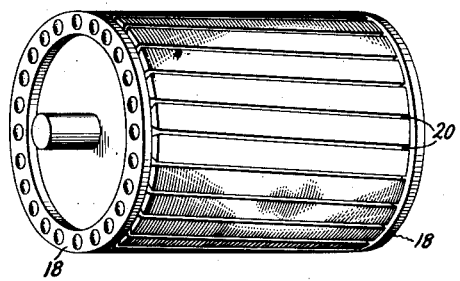
Figure 2:
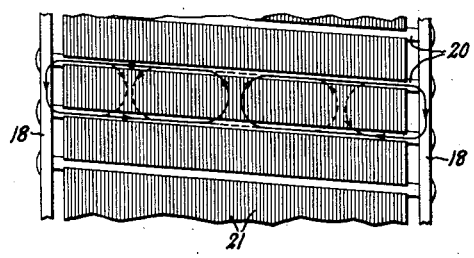
Figure 5:
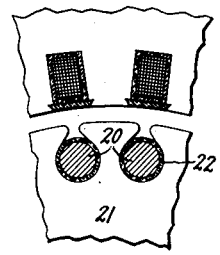
Figure 3:
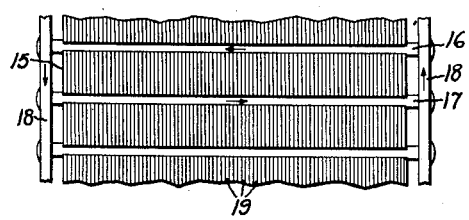

Fig. 1 of the drawings represents a usual tooth relation used in the primary and the secondary of induction machines which relation causes high frequency flux pulsations to thread the secondary teeth and gives rise to certain losses which are very materially reduced by the use of the present invention; Figs. 2 and 3 respresent usual spiraled and unspiraled secondary members and the paths of high frequency damping currents set up therein by the high frequency flux pulsations in the secondary teeth, which currents and the losses incident thereto are eliminated by my invention; Fig. 4 shows a spiraled slot secondary member, and Fig. 5 shows a cross section of a portion of such secondary to illustrate how the bars are insulated in the slots in accordance with my invention.

In Fig. 1, 10 may be considered as representing a portion of the stator primary laminations of a usual form of induction machine. These laminations are slotted and the primary winding represented at 11 is wound in these slots. The slots are closed by non-magnetic wedges 12. These wedges are generally made of wood. At 13 is represented a portion of the laminations of a usual form of secondary for such a machine and 14 represents bars of a squirrel cage winding in the peripheral slots of the secondary.

The two members represented in Fig. 1 rotate with respect to each other and the reluctance of the flux gap between them varies from point to point as the rotor teeth alternately pass the stator teeth and slot space. This variable reluctance at different relative position causes high frequency flux pulsations through the teeth which is more pronounced in the secondary because of the greater width of slot opening in the primary member. These flux pulsations are commonly referred to as tooth frequency pulsations to distinguish them from the lower fundamental flux frequency of the machine. These tooth frequencies in the secondary give rise to hysteresis and eddy current losses and are included in the core and load losses of the machine and may be referred to as the secondary pulsation losses.

In a squirrel cage rotor having non-spiraled slots, as represented in Fig. 3, each tooth 15 is entirely surrounded by a low resistance circuit consisting of two bars 16 and 17 connected together by end rings 18. These circuits are very effective in damping the tooth pulsation, since the high frequency currents therein oppose the high frequency tooth flux pulsations which produce them. The arrows in Fig. 3 indicate a path of the high frequency damping current at a given instant. The high frequency damping current reduces the amplitude of the flux pulsations and the high frequency iron losses, but the high frequency currents are themselves the source of copper losses determined by the flux pulsations and therefore have the semblance of iron losses. It will be apparent that such damping currents will flow in Fig. 3 whether or not the bars are insulated from the rotor laminations 19.

When the slots are spiraled, as represented in Fig. 2, and whether insulated or not the generation of high frequency voltage is not simultaneous in all parts of a bar and if the amount of a spiral is equal to one full tooth pitch of the stator all possible relations of stator and rotor slot are represented at different parts of the bar simultaneously. Representing the variation of permeance due to the relative displacement of a primary and secondary slot by a sign wave, then a full pitch spiral means that the phase angle of the high frequency voltage caused by varying permeance completes 360 electrical degrees in passing from one end of a bar to the other.

If the bars are uninsulated in the slots, damping currents will flow not around the complete circuit as represented in Fig. 3 but around circuits wherein there exists a difference in voltage and across the iron laminations between the bars. Thus at one instant the currents represented by full line arrows in Fig. 2 will flow. At another instant the currents will flow in the dotted line arrow path and so on. The maximum resultant voltage tending to cause such currents to flow is obtained in ½ the length of the bar and is equal to $$\frac{1}{\pi}$$

times the maximum voltage that would be generated in an unspiraled bar.

Now if these bars are insulated from the iron the voltage builds up from end to end of the bars and its resultant over this distance is zero. That is to say, in insulated bar secondary with the slots spiraled a tooth pitch of the stator the tooth frequency voltage generated in the bars is zero and no tooth frequency damping currents flow. The tooth frequency flux pulsations therefore remain at full amplitude and the actual iron losses caused thereby are increased, but no copper losses due to these flux pulsations are present. Thus if we spiral the slots as indicated and insulate the bars in the slots we substitute for iron and copper losses a somewhat higher value of iron losses. The advantage of this substitution is dependent upon the relative magnitude of these losses.

The quality of steel used for the laminated magnetic material of such apparatus has been improved to a point where the actual iron losses are very low and it is desirable to substitute the iron for the copper losses as explained above. It may be pointed out that even with the unspiraled slot arrangement of Fig. 3 the iron losses, due to the tooth frequency pulsations, cannot be reduced to much less than 50% by the most effective damping when there is so much magnetic leakage between primary and secondary conductors as exists in modern machines.

In accordance with my invention therefore I spiral the secondary slots, as shown in Fig. 4, preferably such that the resultant high frequency voltage from end to end of the laminations is substantially zero. This may be done most effectively by spiraling by an amount equal to the primary tooth pitch or any full number of times such pitch, as for example, twice or three times the stator tooth pitch. I also insulate the bars from the laminations, as shown in Fig. 5, where the bars 20 are insulated from the laminations 21 by insulation 22. I do not mean by this that it is necessary to insulate the end rings from the laminations. It is immaterial whether the end rings or the ends of the bars be insulated from the laminations or not. The insulation may be confined to the imbedded portion of the secondary bars.

The insulation necessary for this purpose does not have to be a high voltage insulation but preferably some thin insulation that will not deteriorate or disintegrate by heat and the vibration incident to the service. I have obtained good results with ordinary stove enamel but do not confine my invention to the nature of the insulating material or insulating process used. I have found that the losses in induction motors may be reduced from 15 to 20 per cent by this invention. It will also be apparent to those skilled in the art that the corresponding losses in induction generators of the squirrel cage secondary type may be reduced by the invention and that it is applicable to squirrel cage induction machines generally.

The slots of the secondary illustrated are partially open but the invention will also be useful with wide open as well as totally closed secondary slots where the slots in the primary are such as to set up high frequency flux pulsations between the secondary bars.

What I claim as new and desire to secure by Letters Patent of the United States is:

1. An induction machine having a laminated core squirrel cage secondary member and a slotted primary member, the secondary member having slots spiraled with respect to the stator slots, the secondary bars being insulated from the laminations in the spiraled slots to the extent necessary to substantially eliminate tooth pulsation frequency currents from flowing from bar to bar through the laminations.

2. An induction machine having a squirrel cage secondary member and a slotted primary member, the secondary member having a magnetic core with slots spiraled with respect to the stator slots by an amount substantially equal to one or more times the slot pitch of the stator, the secondary bars of the squirrel cage being insulated in said spiraled slots.

In witness whereof I have hereunto set my hand.

DONALD BRIGHT HOSEASON.